Sept. 21, 1954
T. J. JOHNSON, JR., ET AL
2,689,952
SYSTEM FOR REMOTELY TRANSFERRING VOLTAGES
AS A MEASURE OF ANTENNA BEAM SCANNING
IN RADAR APPARATUS
Filed Dec. 29, 1950
3 Sheets-Sheet 2
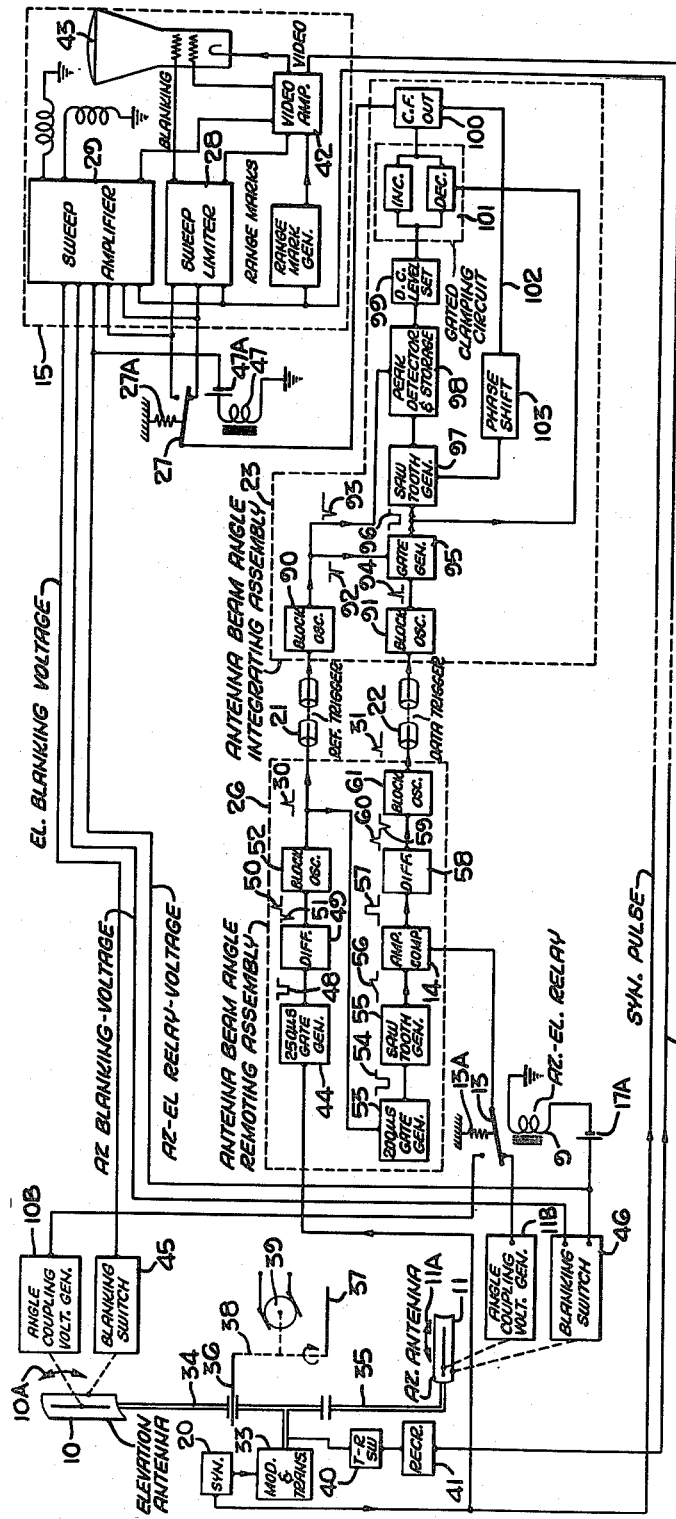
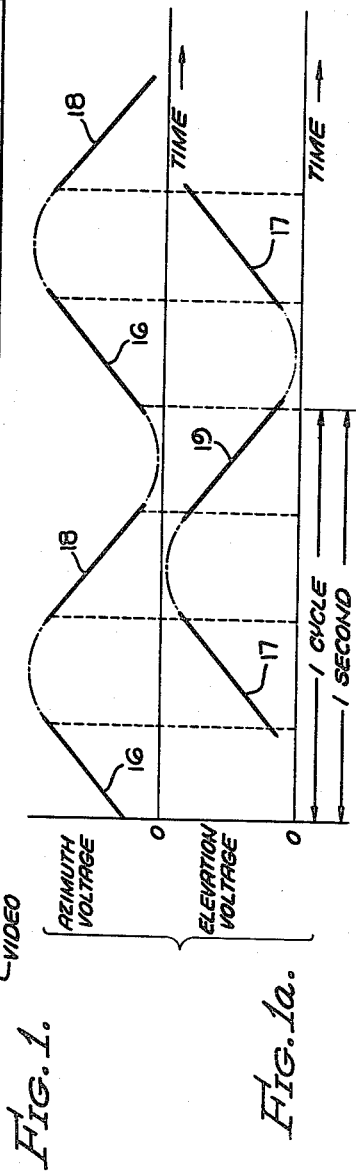
THOMAS J. JOHNSON, JR.
ALVIN G. VAN ALSTYNE
INVENTORS
BY
ATTORNEYS

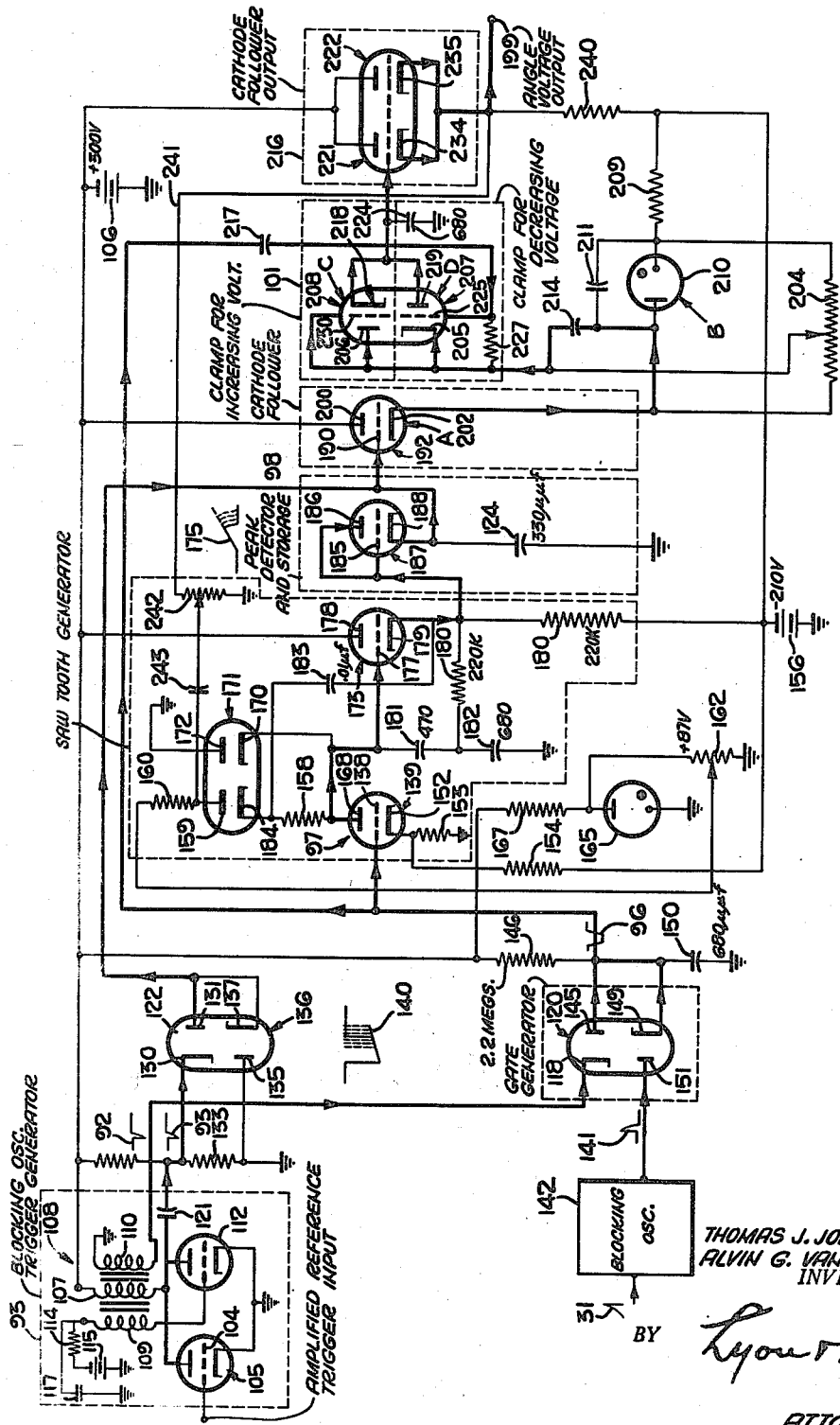

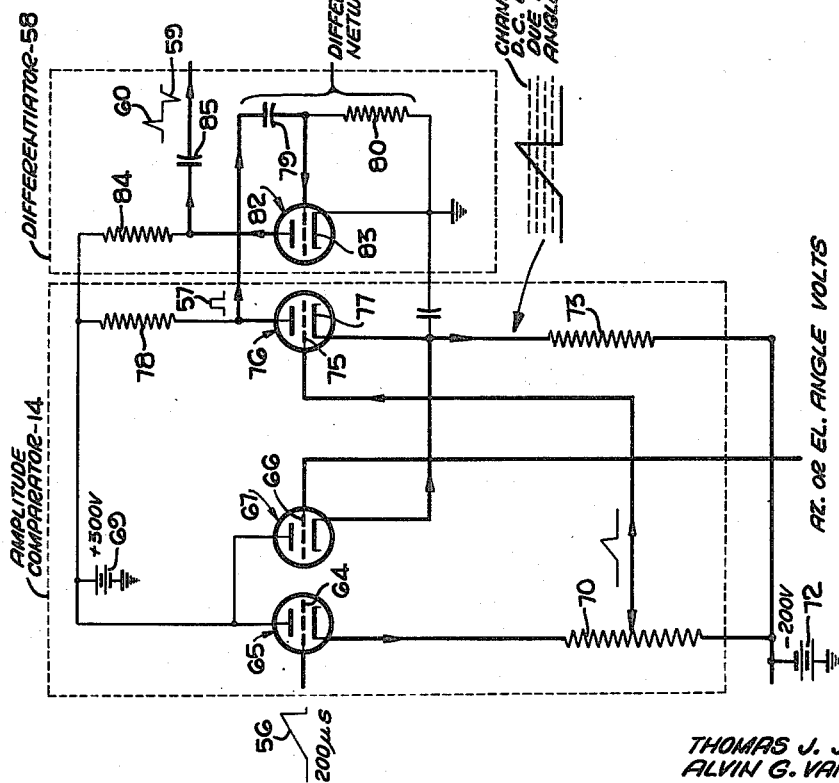

Patented Sept. 21, 1954

2,689,952

UNITED STATES PATENT OFFICE 2,689,952

SYSTEM FOR REMOTELY TRANSFERRING VOLTAGES AS A MEASURE OF ANTENNA BEAM SCANNING IN RADAR APPARATUS

Thomas J. Johnson, Jr., and Alvin G. Van Alstyne, Los Angeles, Calif., assignors to Gilfillan Bros., Inc., Los Angeles, Calif., a corporation of California Application December 29, 1950, Serial No. 203,304

16 Claims. (Cl. 343—5)

The present invention relates to improved means and technique whereby information as to the angular position of a radar antenna beam in the process of scanning is transmitted from the site of the antenna to a remote location, which may be as much as two miles from the antenna location, for effecting operation of an indicating system located at such remote location.

The present invention contemplates an improvement in a ground controlled approach (G. C. A.) radar system in which antenna for producing the scanning beam may, for example, be located adjacent an aircraft landing strip with the associated indicator located at a remote position as, for example, in the control tower which may be located as much as two miles from the antenna itself.

In such systems, the movement of the cathode ray sweeps in the indicator is synchronized with movement of the scanning motion of the antenna beam and, in the usual precision part of a ground controlled approach (G. C. A.) system, a voltage is developed at the antenna which varies in magnitude with the angular position of the antenna beam, and this voltage is conveyed over suitable lines to the indicating system. This developed or generated voltage usually varies substantially linearly with movement of the antenna beam when and as such beam moves from one extreme angular position to the other extreme angular position, and vice versa, with the antenna beam scanning periodically only a fractional part of a circle. The rate of antenna beam scan is usually one scan per second, and accordingly the voltage thus varies cyclically at a corresponding rate of one cycle per second.

It is extremely important, for purposes of accuracy, in systems of this type, that the voltage at the indicator be truly representative of the voltage developed in the movement of the antenna. Difficulties have heretofore been encountered in transmitting this voltage from the antenna to the indicator, especially in those installations where the distance between the antenna and indicator is relatively long and the conductors connecting such stations are subjected to interference resulting, for example, from electromagnetic or electrostatic coupling between the transmission line cable which serves to convey such voltage and nearby power line cables.

It is therefore an object of the present invention to provide improved means and technique whereby the voltage appearing at an indicator is truly representative of the voltage generated or developed upon scanning movement of the associated antenna beam, whereby accurate representations may be obtained on the indicator.

A specific object of the present invention is to provide an improved G. C. A. system in which the so-called "angle voltage" developed upon movement of the scanning beam of the precision antenna located adjacent the aircraft landing strip, which scans in opposite directions cyclically at a low frequency of, for example, one cycle per second, is transmitted with fidelity to an indicator for effecting operation of the same in, for example, a remotely located control tower.

Another specific object of the present invention is to provide improved means and technique of this character which incorporates a pulse-time modulated system of coding in which the time interval between two successive pulses is a measure of the instantaneous angle of the antenna beam while scanning cyclically through a fractional part of a circle.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 shows in schematic form an improved ground controlled approach (G. C. A.) system embodying features of the present invention;

Figure 1A shows the variation of voltage developed in accordance with movement of the beams of the two antennas in the precision section of a G. C. A. radar system;

Figure 2 is a circuit diagram showing the components of the amplitude comparator which is designated in block form in Figure 1;

Figure 3 shows in schematic form the components designated in block form in Figure 1 as peak detector and storage, rectifier for increasing voltage, rectifier for decreasing voltage, switch tube and storage;

Figures 4, 5, 6, 7 and 8 are graphic illustrations helpful in understanding the operation of the antenna angle integrating assembly shown in block form in Figure 1 and the operation of the circuit shown in Figure 3.

Figure 1 shows in schematic form the precision section of a G. C. A. radar system which includes an elevation antenna 10 and an azimuth antenna 11, each of which is arranged to produce an antenna beam that alternately scans the aircraft landing approach zone respectively in elevation and in azimuth. The particular means whereby these antenna beams are alternately oscillated through a fractional part of a circle is not indicated in Figure 1, but their oscillatory movements are represented respectively by the curved arrows 10A and 11A. These antenna beams may be produced by the variable wave guide type of antenna structures described in the copending patent application of Karl A. Allebach, Serial No. 49,910, filed September 18, 1948, now Patent No. 2,596,113, and assigned to the same assignee as the present invention.

Voltages are developed having magnitudes which are proportional to the particular angular positions of the antenna beams in their scanning movements; and, for this purpose, the angle coupling voltage generators 10B and 11B are mechanically coupled respectively to the elevation and azimuth antennas for development of voltages which are alternately applied through the single pole double throw switch 13 to the amplitude comparator 14. Such voltages applied to the amplitude comparator 14 are represented in full lines in Figure 1A, and it is noted that they vary substantially linear from low values corresponding to one extreme position of the antenna beam to maximum values corresponding to the other extreme position of the antenna beam.

The angle voltage remoting apparatus described in greater detail hereinafter is used on a time-sharing basis since, as seen in Figure 1A, the voltage variations 16, 17, 18 and 19 are each transmitted in that order for a period of approximately one-fourth of a second. It is noted that the voltage developed in the angle coupling voltage generators 10B and 11B are represented in Figure 1A and vary cyclically and synchronously at, for example, three cycles per second, corresponding to three scans of the antenna beam per second; and, as indicated previously with reference to Figure 1A, selected portions only, on a time-sharing basis, of the azimuth and elevation voltage variations are applied to the amplitude comparator in the antenna beam angle remoting assembly 26.

It is these voltages, i. e., the so-called "angle coupling voltages," which vary with time as represented in Figure 1A, that are required to be transmitted with fidelity to the indicator section 15 (Figure 1) located, for example, a distance of two miles from the antenna. The present invention concerns itself particularly with the means and technique whereby such angle coupling voltages, represented in full lines in Figure 1A, are transmitted from the site of the antenna to the remotely located indicator section 15.

The angle coupling voltage variations 16, 18 and 17, 19, correspond respectively to movements of the azimuth and elevation antenna beams, with the variations 16 and 17 representing movements of the azimuth and elevation antenna beams, respectively, in, for example, a clockwise direction; and the variations 18 and 19 represent the movements of these same antenna beams, respectively, in the opposite direction, i. e., the counterclockwise direction.

These voltage variations 16, 17, 18 and 19 are applied in that order to the amplitude comparator 14, through relay switch 13, the operation of which is timed to achieve this result by the application of energizing currents to the Az-El (azimuth-elevation) relay winding 9 in accordance with movement of the antenna beams. In general, each of these voltage variations 16, 17, 18 and 19 applied to the comparator 14 are used in generating a pair of pulses, i. e., a so-called reference trigger 30 and a data trigger 31, the data trigger 31 occurring a variable time interval after the reference trigger with such time interval serving as a measure of the instantaneous value of the antenna beam angle voltage, either elevation or azimuth beam angle voltage, as the case may be.

This pair of pulses, i. e., the so-called reference trigger and data trigger, are each developed in the antenna beam angle remoting assembly 26 using the radar system trigger which is generated in the synchronizer unit 20, and such reference and data triggers are transferred over a pair of coaxial transmission lines 21, 22, respectively, to the remotely located antenna beam angle integrating assembly 23.

The antenna beam angle integrating assembly 23 functions to reconstruct the voltage variations 16, 17, 18 and 19 from the received reference and data triggers. The elevation and azimuth beam angle coupling voltages thus derived in the assembly 23 and appearing at the output terminals of the assembly 23 are applied through the single pole double throw switch 27 to both the sweep limiter and sweep amplifier stages 28, 29, respectively, of the character described in the copending application of Tasker et al., Serial No. 776,702, filed September 29, 1947, for Single Scope Two Coordinate Radar Systems, now Patent No. 2,649,581, and assigned to the same assignee as the present invention. In general, these azimuth and elevation beam angle coupling voltages thus derived in the assembly 23 are used to "modulate" the cathode ray sweeps in such a manner that the angular position of the cathode ray sweeps correspond to the instantaneous angular position of the corresponding azimuth or elevation antenna, as the case may be, with however resulting unidirectional expansion in the displays appearing on the cathode ray tube in the indicator section.

Briefly, the apparatus for transmitting and receiving pulses as shown in Figure 1 includes a central timing and synchronizing unit or synchronizer 20, a modulator and transmitting oscillator or transmitter stage 33, an antenna system which includes: the elevation antenna 10, the azimuth antenna 11, the transmission line 34 for feeding energy from the transmitter stage 33 to the antenna 10, the transmission line 35 for transferring energy from the transmitter stage 33 to the antenna 11, and a pair of plates 36, 37 on opposite ends of a crank arm 38 which is rotated at a substantially constant speed by a motor 39, with such plates 36, 37 being arranged to alternately prevent the flow of energy through such transmission lines 34, 35, whereby the antennas 10 and 11 are alternately fed by energy from the transmitter 33. In other words, energy is supplied to the antennas 10, 11 from the transmitter stage 33 on a time-sharing basis. A transmit-receive switch (TR switch) 40 interconnects the receiver 41 with the antenna system. The video output from the receiver is applied to the video amplifier stage 42 in the indicator section 15, and after amplification is applied to one of the elements of the cathode ray tube 43 for effecting intensification of the cathode ray beam as a result of the received echoes.

Also, as indicated hereinbefore, and described in greater detail hereinafter, a synchronous tie exists between movement of the antenna beams radiated from the antennas 10 and 11 and the cathode ray sweeps generated in the cathode ray tube 43.

In general, the synchronizer 20 generates a pulse which is applied to the modulator and transmitter stage 33, and such pulse is also applied to the electrical time measuring circuit in the indicator 15, specifically to the sweep amplifier 29, to start the electrical time measuring circuit, i. e., to initiate radial outward movement of the cathode ray beam sweeps.

Also, in accordance with important features of the present invention, the pulses from synchronizer 20 are applied to the 250 microsecond gate generator 44 in the remoting assembly for production of the aforementioned reference trigger 30.

Also, mechanically coupled to the elevation and azimuth antennas 10, 11 are the blanking switches 45 and 46, respectively, the output of each of which is transferred to the sweep amplifier 29 for purposes of blanking, i. e., rendering invisible the cathode ray trace at predetermined times. Further, the blanking switch 46, when energized, serves to close an energizing circuit for the two azimuth-elevation (Az-El) relay windings 17 and 47, for time-sharing purposes. Each of the relay windings 17 and 47 are serially connected respectively with voltage sources 17A and 47A. These windings 17, 47 are energized in Figure 1 and are thus effective to hold the switch contacts 13 and 27, respectively, in a downward position against the action of the corresponding coil tension springs 13A and 27A; when the windings 17 and 47 are deenergized these springs 13A, 27A effect upward movement of the attached sweep elements 13 and 27 to condition the apparatus for conveying information with respect to the elevation antenna; and when the windings 17 and 47 are energized the apparatus is conditioned for supplying information with respect to the azimuth antenna. Actually, the movements of the crank arm 38, voltage generators 10B, 11B and blanking switches 45, 46 are all synchronized in a manner described in greater detail in the above mentioned copending patent application of Tasker et al., Serial No. 776,702.

To facilitate description of the operation of the remoting assembly 26 and integrating assembly 23, it is assumed that the switches 13, 27 remain in the positions shown in Figure 1, i. e., the indicator system 15 is in a condition to display information obtained when the antenna beam produced by the azimuth antenna 11 scans through space and during the occurrence of voltage variation 16 (Figure 1A).

*Antenna beam angle remoting assembly*

Briefly, with reference to Figure 1, trigger pulses from the synchronizer 20 are applied, at a rate of, for example, 2,000 per second to the input circuit of a 250 microsecond gate generator, with the result that negative gating voltages 48, having a time duration of 250 microseconds and with a repetition rate of 2,000 per second, are delivered to the differentiating stage 49 whereby the leading and trailing edges of the gating voltages are differentiated to produce respectively the positive peak 50 and negative peak 51 at the output of the differentiating stage 49. Such pulses 50, 51 are applied to the blocking oscillator stage 52 which is receptive substantially only to the positive peak 50, and such oscillator stage 52 functions to produce the sharp reference triggers 30 at its output terminals. Such reference triggers 30, occurring with a repetition rate of 2,000 per second are applied to the inner conductor of the coaxial transmission line 21; and likewise such triggers 30 are applied to the 200 microsecond gate generator 53 to produce negative gating voltages 54, each having a time duration of 200 microseconds. Such negative gating voltages 54 initiate operation of the sawtooth generator 55, and the output of the generator 55, in the form of sawtooth waves 56 is applied to the amplitude comparator 14, wherein the changing amplitude of the sawtooth wave 56 is "compared" with the voltage being generated by the angle coupling voltage generator 11B and shown, at this particular time, as the voltage variation 16 in Figure 1A.

The amplitude comparator 14 functions, when the amplitude of the sawtooth wave 56 is substantially equal, at the instant considered, to the magnitude of the voltage 16 (Figure 1A), to produce the positive pulse 57. Such positive pulse 57 is differentiated in the differentiating network 58 to produce the negative voltage wave peak 59 and positive voltage wave peak 60; and, the voltage pulse thus differentiated is applied to the blocking oscillator stage 61 which is receptive substantially only to the positive peak 60. In response to such positive peak 60 the blocking oscillator 61 generates the sharp data trigger 31 which is applied to the inner conductor of the coaxial cable 22 for transmission to the remotely located antenna beam angle integrating assembly. It is important to observe at this time that while the reference and data triggers 30, 31 respectively have the general shape and are applied over different transmission lines, the data trigger occurs a predetermined time interval after the occurrence of the reference trigger 30, and that such time interval between the pulses 30, 31 is a measure of the voltage generated in the voltage generator 11B and represented by the variation 16 in Figure 1A. The reason for this is made clear from the description which follows with respect to Figure 2, which shows in greater detail the circuitry in the amplitude comparison stage 14.

In Figure 2, the sawtooth voltage waves 56, of 200 microsecond duration (time for rise of the wave from minimum to maximum value is 200 microseconds), are applied to the control grid 64 of the cathode follower tube 65, while the voltage developed in the voltage generator 11B (Figure 1) is applied to the control grid 66 of the cathode follower tube 67. The anodes of tubes 65 and 67 are connected to the positive ungrounded terminal of voltage source 69. The cathode of tube 65 is connected to one terminal of the output load resistance 70, which has its other terminal connected to the negative ungrounded terminal of voltage source 72. Likewise, the cathode of tube 67 is connected to one terminal of the resistance 73, which has its other terminal connected to the negative terminal of the voltage source 72.

A fractional part of the sawtooth wave appearing across resistance 70 is applied to the control grid 75 of the tube 76 which, in the quiescent state, is normally non-conducting for reasons mentioned hereinafter. Specifically, the control grid 75 is connected to an intermediate point on the resistance 70, resistance 70 being used to establish the proper voltage level at grid 75 of tube 76.

It is observed, from a study of Figure 1A that the voltage variation 16, now under consideration, as well as the other voltage variations 17, 18 and 19, all represent positive values of voltage, and such positive voltages are applied to the control grid 66 to cause the tube 67 to conduct space current. Such space current flows through the resistance 73, and the resulting voltage developed across resistance 73, which is likewise connected between the cathode 77 and the negative terminal of source 72, imposes a sufficiently high bias on the control electrode 75 to thereby render the tube 76 non-conducting (in the absence of sawtooth wave 56, i. e., in the quiescent state). It should be carefully observed that such bias voltage on control grid 75 varies in amplitude in accordance with the instantaneous magnitude of the voltage variation 16. The tube 76 is rendered conducting only when the instantaneous amplitude of the sawtooth wave 56 applied to control grid 75 substantially equals the bias voltage. In this respect it should likewise be carefully observed that a definite time is required for such sawtooth wave to reach such amplitude whereby the tube 76 is rendered conducting so that space current may flow through the output load resistance 78, which is connected between the anode of tube 76 and the positive terminal of source 69. Such current flow through resistance 78 results in production of the positive pulse 57 (Figures 2 and 1), which is applied to the differentiating network comprising the serially connected condenser 79 and resistance 80. It is noted that one terminal of condenser 79 is connected to the anode of tube 76; that one terminal of resistance 80 is connected to the grounded cathode 83; and that the junction point of condenser 79 and resistance 80 is connected to the grid of tube 82, which has its anode connected to the positive terminal of source 69 through resistance 84. The tube 82 thus serves essentially as an amplifier stage having the output thereof in the form of peaked voltage waves 59 and 60 applied through condenser 85 to the blocking oscillator stage 61 in Figure 1. The blocking oscillator 61, as mentioned previously, is receptive substantially only to the positive peaked wave 60 and functions to produce a sharply defined data trigger 31.

It is important to note that the data trigger 31 lags the reference trigger 30 by a time interval which is a measure of the instantaneous voltage applied to the control grid 66. This is so since a definite time interval is required for the sawtooth voltage applied to grid 75 to assume a magnitude sufficient to render the tube 76 conducting. This time lag between the reference trigger and data trigger 31 is thus within 200 microseconds while, of course, the voltage applied to control grid 66 varies at a relatively small rate, as observed in Figure 1A. While the time involved in one complete voltage variation 16 is in the order of one-fourth of a second, it is noted that the sawtooth voltage waves applied to control grid 75 occur at a much higher repetition rate of 2,000 per second.

The reference and data triggers 30 and 31 thus developed in the remoting assembly 48 are transmitted to the remotely located integrating assembly 23 over separate transmission lines 21 and 22, respectively. The function of the integrating assembly, as described in detail hereinafter, is to reconstruct the original voltage variation 16, 17, 18 or 19, as the case may be, from information supplied to the same in the form of variable spaced reference and data triggers.

*Antenna beam angle integrating assembly 23*

As mentioned above, the purpose of this assembly is to reconstruct the voltage variations shown in full lines in Figure 1A, using the reference trigger 30 and data trigger 31 transmitted over the separate coaxial cables 21, 22.

These triggers 30, 31 received at the assembly 23 may first, if desired, be applied to separate amplifier stages (not shown) before being applied to the blocking oscillators 90 and 91, respectively, for "resharpening" the triggers 30, 31 which may have been distorted and thus lost their sharpness in transmission. The reference trigger is applied to the blocking oscillator 90, after amplification if desired, and the output of the blocking oscillator is in the form of two sharp negative pulses or triggers 92 and 93, occurring simultaneously, while the output of the data trigger blocking oscillator 91 is in the form of a positive trigger 94. The reference trigger 92 initiates operation of the gating voltage generator 95, and the following data trigger 94 serves to terminate the gating voltage being produced in response to the trigger 92. Thus, the gating generator 95 serves to generate negative gating voltages 96, the duration of which is variable in accordance with the time interval between the reference trigger 92 and data trigger 94.

The variable width gate 96 thus produced initiates operation of the sawtooth generator 97, which generates a voltage increasing at a constant rate. The length of the sawtooth voltages generated by generator 97 is determined by the width of the pulse 96, so that the maximum value of the sawtooth wave is a measure of the width of the pulse 96, and thus a measure of the time interval between the triggers 92 and 94. The output of the sawtooth generator 97 is peak detected in the "peak detector and storage stage" 98. Associated with the peak detector in stage 98 is a storage device, in this instance a capacitor, which serves to maintain the positive peak values of detected voltage during successive operations of the sawtooth generator 97. The unidirectional voltage thus appearing on the capacitor in stage 98 is applied, through a D. C. level setting stage 99, to a gated clamping circuit 101, such clamping circuit 101 being gated by gating voltage developed in the gate generator 95. The capacitor in the peak detector stage 98 is periodically discharged by the reference trigger 93 applied to such stage. The output of the cathode follower stage 100 is in the form of the voltage variations shown in Figure 1A, and such voltage variations are applied through the time switch 27 to the sweep limiter and sweep amplifier stages 28, 29 for producing that type of indication set forth in the aforementioned copending application of Tasker et al., Serial No. 776,702.

To improve the operation of this circuit described generally above, a feedback path 102, including an adjustable phase shifting circuit 103, is connected between the cathode follower output stage 100 and sawtooth generator 97. In general, this feedback circuit serves to avoid lag in operation of this integrating assembly.

This integrating assembly 23, while described in general with reference to Figure 1 above, is described in greater detail with reference to Figure 3. The reference trigger 30, either amplified or not, as desired, is applied to the control electrode 104 of the tube 105, which has its cathode grounded and its anode connected to the positive terminal of voltage source 106 through the winding 107 of the blocking oscillator transformer 108, which includes also the windings 109 and 110. Tube 112 has its cathode grounded and its control grid connected through winding 109 and resistance 114 to the negative ungrounded terminal of voltage source 115, such resistance 114 and source 115 being shunted by the capacitor 117. The anode of tube 112 is connected to the anode of tube 105. The other winding 110 has one of its terminals grounded and the other one of its terminals connected to supply a negative reference trigger 92 to the cathode 118 of the tube 120. Also, the connected anodes of tubes 105 and 112 are connected through the condenser 121 and diode 122 to the ungrounded terminal of the condenser 124 for periodically discharging such condenser, using the negative trigger 93.

Specifically, the condenser 121 is connected to the cathode 130 of diode 122 and the anode 131 is connected to the ungrounded terminal of condenser 124. Further, such cathode 130 is connected to ground through resistance 133. The anode 135 of tube 136 is grounded and the associated cathode 137 is connected to the ungrounded terminal of condenser 124.

The gate generator 95 functions to produce variable width gating voltages which are applied to the control grid 138 of the tube 139 of the sawtooth generator stage 97. The voltage applied to such grid 138 comprises a variable width gate represented at 140.

In general, the operation of the gate generator 95 is such that the negative trigger 92 initiates formation of the gating voltage, while the data trigger 141 supplied from the blocking oscillator 142 terminates such gating voltage, the length of the gating voltage thus being a measure of the spacing between the reference trigger pulse 93 and the data trigger 141. For this purpose the anode 145 of tube 120 is connected through resistance 146 to the positive terminal of voltage source 106, and such anode 145 is connected to the cathode 149 and the ungrounded terminal of condenser 150. The anode 151 associated with the cathode 149 is connected to the output of the blocking oscillator stage 142 to receive the pulse 141. The operation of the gate generator 95 is briefly as follows: In the quiescent state the anode 145 has a voltage determined by the voltage on condenser 150, i. e., the voltage drop across resistance 146 resulting from the space current flowing from the positive terminal of source 106 through resistance 146 and through the grid cathode of tube 139 through resistor 154 to the negative source 156. Upon the application of the negative trigger 92 to the cathode 118, the condenser 150 is charged negatively. After disappearance of the reference trigger 93 the potential of anode 145 is maintained substantially at that depressed potential, inasmuch as the condenser 150 discharges at a relatively slow rate, the condenser 150 having, for example, a capacity of 680 micromicrofarads and the resistance 146 being in the order of 2.2 megohms. Subsequently, the positive trigger 141 applied through the diode, which comprises the elements 151 and 149, discharges the condenser 150 to terminate the gating voltage thus formed.

The variable width gating waves, represented at 96 and 140 in Figure 3, are applied both to the control grid 138 of the sawtooth generator stage 97 as well as to the clamping stage 101, which incorporates a pair of triodes, such clamping stage 101 being gated, in a manner described hereinafter, by such variable width gating voltages 96. The cathode 152 of tube 139 is connected to ground through the cathode resistance 153; and also through resistance 154 to the negative ungrounded terminal of the bias voltage source 156. The anode 168 of tube 139 is supplied with a regulated voltage, and for that purpose is connected through a series circuit comprising: the resistance 158, the diode 159, resistance 160, to an adjustable tap on the potentiometer resistance 162, which has one of its terminals grounded and the other one of its terminals connected to the ungrounded terminal of the voltage regulator tube 165, such ungrounded terminal of tube 165 being connected through resistance 167 to the positive terminal voltage source 106.

The circuit elements associated with tube 139 described above are intended to stabilize the operation of the sawtooth generator stage 97 to such an extent that it is stable in operation and functions satisfactorily with replacement tubes for the tube 139, even though the characteristics of such replacement tubes are somewhat different. To achieve this general purpose, the anode 168 of tube 139 is connected to the cathode 170 of diode 171 which has its anode 172 grounded. By thus providing tube 171 and returning the cathode 152 to a negative return, i. e., the negative terminal of source 156, the operation of this stage 97 is stabilized. It is noted that the voltage at the anode 168 of tube 139 is determined by the potential which is necessary to cause space current to flow in diode 171. This circuit is thus stabilized for variations in the characteristics of tube 139. Tube 165 serves to stabilize the sawtooth generator for variations in the positive supply voltage 106.

In the quiescent state, i. e., in the absence of a gating voltage 96, the grid 138 of tube 139 is clamped at zero volts or slightly positive with respect to the cathode 152. This results from space current flowing from the positive ungrounded end of supply 106 through the large resistor 146 to the grid 138 of tube 139. As a result of the grid-cathode voltage thus obtained the anode space current is caused to be at the saturation or maximum value. This will cause the voltage on anode 168 to be depressed to its lowest value, slightly negative, as limited by the fraction of a volt which will cause diode 171 to conduct space current. The current which flows through resistor 158 during this quiescent period is established by the potential at the cathode 170 of diode 171 (a fraction of a volt negative) and by the potential set at the cathode 184 of diode 159 by variable resistor 162. When the negative gate 96 is applied to grid 138, the anode space current of tube 139 is caused to cease. This action causes the voltage on the capacitor combination 181 and 182 to start rising toward the positive voltage at the cathode 184 of diode 159 at a rate determined by the capacitance of capacitor combination 181 and 182 and the resistance of resistor 158. The rising voltage on capacitor combination 181 and 182 is applied to the grid 177 of the cathode follower which is made up of tube 173 and resistor 180. The output from the cathode of tube 173 is connected to the opposite end of resistor 158 from the capacitor combination 181 and 182. Thus the rising voltage at the capacitor combination 181 and 182 is applied to both ends of resistor 158, i. e., one end by the direct conductive connection and the other end by the cathode follower tube 173 and capacitor 183. Since the same rising voltage displaced only by a direct current drop appears at both ends of resistor 158, a steady current flows through this resistor. This steady current which can flow only into the capacitor combination 181 and 182 causes this voltage to rise completely linearly with time. Diode 159 acts in such a manner as to isolate the charging circuit from the positive supply during the sawtooth rise in voltage. All of the charge which is transferred to capacitor combination 181 and 182 is supplied by capacitor 183.

The cathode follower tube 173 has its control grid 177 connected to the anode 168 and its anode 178 connected to the positive terminal of source 106, while the cathode 179 is connected through the load resistance 180 to the negative terminal of source 156. The cathode 179 is connected through resistance 180 to the junction point of condensers 181 and 182, the condenser 182 having one of its terminals grounded and condenser 181 having one of its terminals connected both to the anode 168 and control grid 177. Also, the cathode 179 is connected through condenser 183 to the cathode 184 of the diode 159.

Thus the sawtooth waves 175 have a variable length corresponding to the variable length of the gating voltage 140, which in turn is determined by the time interval between the reference trigger 93 and data trigger 141.

The sawtooth voltage waves 175 appearing on the cathode 179 are applied to the peak detector and storage stage 98, and specifically to the control grid 185 and anode 186 of tube 187. The cathode 188 of tube 187 is connected to the ungrounded terminal of the condenser 124, as well as to the control grid 190 of the cathode follower tube 192.

It is noted that there is no discharge path, as such, for the charge accumulated in condenser 124, but such condenser 124 is discharged periodically and in timed relationship with appearance of the reference trigger pulse 93. As a matter of fact, this reference trigger 93 is applied through the diode 122 to effect discharge of the condenser 124. Thus, the voltage across the condenser 124 is clamped to zero upon the occurrence of each reference trigger pulse. However, subsequently, this condenser 124 is charged at a substantially linear rate in accordance with the rate of rise of the sawtooth voltage wave 175, and the ultimate voltage on the condenser 124 after disappearance of the sawtooth wave 175 assumes a value which is a measure of the maximum value the particular sawtooth attained in its rise. This maximum value of voltage in condenser 124 is maintained until the appearance of the succeeding reference trigger 93 which serves to discharge such condenser 124. Thus, the voltage across condenser 124 varies as a function of time either in accordance with the full line graph 193 in Figure 5 or the full line graph 194 in Figure 7, depending respectively upon whether or not the triggers 93 and 141 represent, at the particular instant concerned, increasing voltages such as voltage variations 16 and 17 in Figure 1A, or decreasing voltage variations as represented at 18 and 19 in Figure 1A.

In Figures 5 and 7 the locus of the peaks of the full line curves are represented by the dotted lines 195 and 196, respectively, and it is such continuous voltage variations as represented by such curves 195, 196 which are desired to be applied to the sweep amplifier and sweep limiter 29 and 28 (Figure 1) in the indicator section of the radar system. In other words, it is desired that the steps in the voltage waves 193 and 194 be eliminated as much as possible, and for that purpose generally the gated clamping circuit 101 (Figure 1) is utilized to effectively disconnect the condenser 124 from the sweep amplifier 29 and sweep limiter 28 (Figure 1) during the time such steps are being produced. The circuit described hereinafter is intended to accomplish this general result, and to derive the voltage variations 197 and 198 (Figures 6 and 8), respectively, from the more stepped voltage variations 193 and 194.

Comparing Figures 4, 5, 6, 7 and 8, they each represent voltage variations as a function of time on the same time base. Figure 4 represents, in full lines, the voltage output of the sawtooth generator as a result of a successive series of pulses 93, 141, and the dotted line in Figure 4 indicates the locus of peaks of these sawtooth waves and shows that these sawtooth waves increase in amplitude, i. e., increase in amplitude as the time interval between pulses 93 and 141 increases. Figure 5 shows in full lines the resulting voltage output of the peak detector stage 98, and the full line variation 197 in Figure 6 represents the voltage variation appearing in the output terminal 199 in Figure 3. Figure 7 shows voltage variations corresponding to voltage variations shown in Figure 5, but such variations in Figure 7 are the result of recurrent sawtooth voltage waves of decreasing amplitude, i. e., voltage variations in Figure 7 correspond to the condition wherein the time interval between successive sets of reference and data triggers 93 and 141 decreases. Figure 8 shows a voltage variation appearing at the output terminal 199 in response to the voltage variation shown in Figure 7.

The manner in which the voltage variations in Figures 6 and 8 are obtained respectively from the corresponding voltage variations of Figures 5 and 7 is now described in detail with reference to Figure 3. The voltage variation of Figure 5 is thus applied to the control grid 190 in Figure 3. Associated anode 200 of the cathode follower tube 192 is connected to the positive terminal of source 106, while the cathode 202 is connected to the negative terminal of source 156 through the potentiometer resistance 204 and resistance 209, the adjustable tap on resistance 204 being connected to the cathode 205 and anode 206 of the tubes 207 and 208, respectively. It is noted that for purposes of establishing the correct voltage level the resistance 204 is connected in shunt with the voltage regulator tube 210 and bypassed by a condenser 211. Thus, an adjustable voltage may be applied from the adjustable tap on the resistance 204 to the cathode 205 and anode 206. Further, the voltages appearing on the cathode tube 202 are applied through the coupling condenser 214 to the interconnected cathode 205 and anode 206.

In general, the tube 207 serves as a clamper for decreasing voltages appearing on the cathode 202; and the other tube 208 serves in similar capacity as a clamper for increasing voltages appearing on the cathode 202. In other words, the tube 207 is effective to transfer voltages to the cathode follower output stage 216, while the peak detector output voltage decreases; while the tube 208 is effective to transmit voltages to the cathode follower output stage 216 during the time the voltage output of the peak detector increases. This statement is qualified, however, to the extent that tube 207 is ineffective in transferring such decreasing voltages, at the time this tube 207 is being rendered non-conducting by the application of the gating voltage 96 thereto through the coupling condenser 217.

It is noted that the setting of the variable tap on the potentiometer resistance 204 adjusts the direct current level at which the tubes 207 and 208 are effective to conduct.

For these general purposes the cathode 218 of tube 208 and the anode 219 of tube 207 are interconnected and connected to the control grids of the parallel connected cathode follower tubes 221, 222, as well as to the ungrounded terminal of condenser 224. The control grid 225 of tube 207 is connected to one terminal of condenser 217, as well as to the associated cathode 205 through resistance 227. Thus, the gating voltages applied through coupling condenser 217 are applied to the control grid 225 of tube 207. The negative gating voltages transmitted through condenser 217 to the grid 225 appear, at substantially the same time, as the sawtooth waves applied to the storage condenser 124, i. e., during the rising portions of the full line voltage variations 193 and 194, respectively, in Figures 5 and 7. During such time interval the interconnected control grids 234, 235 are effectively disconnected from the cathode 202, and thus such grids 234, 235 are rendered substantially insensitive to the rising voltages appearing on the cathode 202. This results in a more continuous voltage applied to the control grids 234, 235. The anodes of cathode follower tubes 221, 222 are connected to the positive terminal of source 166, and their interconnected cathodes are connected to the angle voltage output terminal 199 as well as to the negative terminal of voltage source 156 through the output resistance 240.

In order to prevent sluggishness in operation, i. e., to overcome lag in the circuit elements, a feedback path 241 is provided, such feedback path 241 extending from the output terminal 199 to the ungrounded terminal of the potentiometer resistance 242. The adjustable tap on the resistance 242 is connected through condenser 243 to the anode of tube 159, whereby voltage variations appearing on the output terminal 199 are transferred back to the sawtooth voltage generating stage 97 with an adjustable phase shift determined by the setting of the tap on resistance 242. By this feedback connection 241, the anode 168 of the sawtooth generating tube 139 is rendered more positive for increasing voltages appearing at terminal 199; and conversely the potential on anode 168 is rendered more negative when decreasing voltages appear at terminal 199. The adjustment of the tap on resistance 162 likewise affects the potential of anode 168, but such adjustment is static in nature, whereas the feedback connection 241, while producing generally the same functions, i. e., controlling the potential of the anode 168, is dynamic in nature with the voltage on the anode 168 changing in accordance with the voltage conditions at terminal 199.

The voltage thus appearing on the output terminal 199 is applied, as shown in Figure 1, through the Az-El relay switch 27 to both the sweep limiter 28 and sweep amplifier 29 for producing their effect on the cathode ray tube indicator. This voltage thus applied varies, for example, from 2 volts to 52 volts or from 52 volts to 2 volts, as the case may be, in accordance with the variations shown in Figure 1A. These voltage variations, as shown in Figure 1A, are relatively slow, whereas the reference and data triggers occur at a relatively high repetition rate of 2,000 per second. These voltages appearing in Figure 1A are thus reconverted when and as the time interval between the reference and data triggers varies from, for example, 50 microseconds to 150 microseconds, i. e., when the time interval between the reference trigger and data trigger is 50 microseconds the voltage appearing at the output terminal 199 is 2 volts; and when the time interval between the reference and data triggers is 150 microseconds the voltage appearing at the output terminal 199 is 52 volts. In other words, the time differential of 100 microseconds, i. e., 150 minus 50, corresponds to a voltage variation of 50 volts, i. e., 52 minus 2.

The range of voltage variation in general is adjusted by adjusting the position of the tap on the resistance 162, whereas in general the level at which such voltage variation occurs is adjusted by adjusting the position of the variable tap on the resistance 204.

Preferably, the reference trigger 92 follows the system trigger generated in the synchronizer 20 (Figure 1) by 250 seconds, such time differential being established by first applying the trigger from the synchronizer 20 to the 250 microsecond gate generator 44 in the remoting assembly 26. This condition is desirable since the "listening" time for radar echoes lasts for approximately only 125 microseconds after the system trigger. Thus, the antenna angle information is sent over the transmission lines 21, 22 after arrival of all of the video information to avoid interference and simplify the decoding apparatus at the remote location.

While it is preferred to use two coaxial cables 21, 22 for this purpose, the same information as developed herein may be transmitted over a single coaxial cable if desired.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a system of the character described, antenna means for producing an electromagnetic beam comprising pulses of radiated electromagnetic energy at a relatively high rate, means periodically delivering said electromagnetic energy to said antenna means, echo receiving means coupled to said antenna means for receiving echoes in response to reflections of said electromagnetic energy, means periodically moving said antenna beam to produce a scanning movement thereof at a relatively low rate, means deriving a continuously varying voltage in accordance with said scanning movement, with the instantaneous magnitude of said voltage being a measure of the particular angular position of said beam, means operated synchronously with said delivering means and deriving a pair of pulses spaced in time in accordance with the instantaneous magnitude of said voltage, means at a remote location recreating said voltage in accordance with the time interval between said pair of pulses, and said pulse deriving means incorporating delay means whereby said pair of pulses occur after reception of all echoes resulting from one transmitted energy pulse.

2. In a system of the character described, antenna means for producing an antenna beam comprising pulses of radiated electromagnetic energy at a relatively high rate, a transmitter coupled to said antenna means to recurrently deliver said electromagnetic energy thereto, trigger generating means for periodically initiating operation of said transmitter, means producing scanning movement of said beam, means deriving a continuously varying voltage the instantaneous amplitude of which is a measure of the particular instantaneous angular position of said antenna beam in its scanning movement, said scanning movement being at a relatively low cyclical rate, reference and data trigger generating means coupled to said trigger generating means and to said voltage deriving means for producing a reference and data trigger with a time interval therebetween which is a measure of the instantaneous value of said voltage, voltage recreating means coupled to said reference and data trigger generating means for reconverting said voltage in accordance with the spacing between said reference and data triggers, and indicating means coupled to said voltage recreating means.

3. The arrangement set forth in claim 2 in which echo receiving means is coupled to said antenna means to receive echoes resulting from reflections of said electromagnetic beam, and said reference and data trigger generating means includes delay means whereby a pair of said reference and data triggers are formed after reception of substantially all echoes resulting from one transmitted energy pulse.

4. In a system of the character described, an antenna beam angle remoting assembly comprising: a first gating voltage generator, trigger generating means coupled to and periodically initiating operation of said first gating voltage generator to produce a first gating voltage of relatively long duration, a differentiating network coupled to said first gating voltage generator to produce peaked voltages of opposite polarity corresponding respectively to the leading and trailing edges of said first gating voltage, means coupled to said differentiating network for deriving a sharpened reference trigger which corresponds to the trailing edge of said first gating voltage, a first transmission line coupled to the last mentioned means for transferring said reference trigger to a remote location, a second gating voltage generator coupled to said last mentioned means for producing a second gating voltage of relatively long duration with the beginning of said second gating voltage corresponding to the trailing edge of said first gating voltage, a sawtooth generator coupled to said second gating voltage generator to periodically form sawtooth voltage waves in accordance with the time duration of said second gating voltage, an amplitude comparison stage coupled to said sawtooth generator, antenna beam scanning means producing an antenna beam scanning through space, means deriving a voltage which varies continuously at a relatively small cyclical rate in comparison with the repetition rate of said first gating voltage with the instantaneous magnitude of said voltage representing the instantaneous angular position of said antenna beam, said amplitude comparison stage incorporating means whereby the instantaneous magnitudes of said sawtooth and last mentioned voltages are compared, and whereby a third gating voltage is produced when the magnitudes of said voltages differ a predetermined constant amount, a differentiating network coupled to said amplitude comparison stage for deriving peaked voltages corresponding respectively to the leading and trailing edges of said third gating voltage, data trigger generating means coupled to the last mentioned differentiating network for deriving a data trigger voltage in accordance with one of the last mentioned peaked voltages, and a second transmission line coupled to said data trigger generating means.

5. In a system of the character described, an oscillating antenna beam scanning periodically through a fractional part of a circle, means deriving in timed sequence substantially linearly varying voltages which continuously increase or continuously decrease, depending respectively upon the direction of oscillating movement of the antenna beam, means developing a pair of pulses spaced a time interval which is a measure of the instantaneous magnitude of said continuously varying voltages, and means recreating said continuously varying voltages in response to the time interval between said pulses.

6. In a system of the character described, an oscillating antenna beam moving first in one direction and then in the other reverse direction in scanning space, said antenna beam oscillating at a relatively low frequency, means deriving a continuously increasing voltage and a continuously decreasing voltage, respectively, when and as said antenna beam moves in said one direction and in said other direction, pulse forming means developing a reference pulse and a companion data pulse with such pulses spaced a time interval which is a measure of the instantaneous value of said increasing voltage or decreasing voltage, as the case may be, said pulse forming means incorporating means whereby said reference pulse and its companion data pulse are generated at a relatively high repetition rate compared to the rate of oscillating movement of said antenna beam, and means recreating said continuously increasing voltage and continuously decreasing voltage in response to the time interval between said reference and data pulses.

7. In a system of the character described wherein it is desired to transmit information as to the angular position of an antenna beam to a remotely located point, the improvement which comprises developing a voltage the magnitude of which varies continuously in accordance with the angular position of said antenna beam, deriving a reference and a data pulse separated by a time interval which is a measure of the magnitude of such voltage, transmitting said reference and data pulses to said remotely located point, and deriving from said reference and data pulses a voltage varying in magnitude in accordance with the time interval between said reference and data pulses.

8. In a system of the character described, an azimuth antenna forming an azimuth beam, an elevation antenna forming an elevation beam, each of said azimuth and elevation beams oscillating generally through the same space, means coupled to each of said azimuth and elevation antennas for producing continuously increasing or continuously decreasing voltages corresponding respectively to whether the azimuth and elevation beams are being moved outwardly or inwardly in their oscillatory movement, means deriving a pair of spaced pulses, the time interval between which is a measure of the instantaneous magnitude of said increasing or decreasing voltage, as the case may be, means forming a substantially continuously increasing and a substantially continuously decreasing voltage in response to the time interval between said pulses.

9. In a system of the character described, an antenna beam angle integrating assembly comprising a first blocking oscillator stage having its input terminal connected to a first cable for receiving reference triggers, a second cable, a second blocking oscillator having its input terminal connected to said second cable to receive data triggers, a gating voltage generator for generating gating voltages of variable widths, the operation of said gating voltage generator being initiated by pulses delivered thereto from said first blocking oscillator, the operation of said gating voltage generator being terminated by pulses delivered thereto from said second blocking oscillator stage whereby the width of the gating voltage generated in said gating voltage generator is determined by the time interval between the triggers supplied thereto by said first and second blocking oscillators, respectively, a sawtooth generator coupled to and operated by gating voltages delivered thereto from said gating voltage generator, said sawtooth generator incorporating means whereby the duration of the sawtooth voltages generated therein is determined by the length of the gating voltages delivered thereto, a peak detector and storage stage coupled to said sawtooth generator, said peak detector and storage stage including a condenser which is periodically charged with a voltage determined by the maximum value of the sawtooth voltage applied to said detector stage, means coupling said first blocking oscillator to said peak detector and storage stage for discharging said condenser in timed relationship with the reference triggers coupled to said blocking oscillator stage, indicating means, a gated clamping circuit coupling said condenser to said indicating means, and means coupling the gating voltage to said clamping circuit to render said circuit inoperative as a coupling circuit during the duration of said gating voltage.

10. In a system of the character described, a gating voltage generator, said generator incorporating means for generating a gating voltage the duration of which is determined by the time interval between reference and data trigger voltages applied thereto, a sawtooth generator coupled to said gating voltage generator and incorporating means for generating sawtooth voltage waves having a substantially constant rise rate and with the duration of the sawtooth determined by the duration of the gating voltage whereby the peak value of the sawtooth voltage wave is determined by the duration of the gating voltage supplied thereto, a peak detector and storage stage coupled to said sawtooth voltage wave, said peak detector and storage stage incorporating a condenser charged periodically and in accordance with the maximum magnitude of the sawtooth voltage wave delivered to said peak detector and storage stage, means periodically discharging said condenser in timed relationship with the appearance of reference trigger voltages, a voltage utilization device, a clamping circuit coupling said utilization device to said condenser, and means coupling said gating voltage generator to said clamping circuit to render the same inoperative during the duration of the gating voltage.

11. The arrangement set forth in claim 10 in which a feedback circuit is connected between the output of said coupling stage and said sawtooth generator for overcoming sluggishness in operation of the system.

12. In a system of the character described in which it is desired to transmit information as to the angular position of an antenna beam scanning through space to a remote location, the improvement which resides in deriving a continuously varying voltage, the instantaneous magnitude of which is a measure of the particular angular position of the antenna beam, deriving a pair of spaced reference and data triggers with a time interval between the same varying in accordance with the particular magnitude of said voltage, transmitting said reference and data triggers to said remote location, and recreating at said remote location a voltage which varies in magnitude in accordance with the spacing between said reference and data triggers.

13. In a radar system of the character described wherein pulses of electromagnetic energy occurring at a relatively high repetition rate are supplied to antenna means to form an antenna beam, and wherein said antenna beam is caused to scan through space at a relatively low cyclical rate compared to the aforementioned repetition rate, and wherein receiving means is coupled to said antenna means to receive echoes resulting from reflections of said electromagnetic beam, and wherein information as to the particular position of said antenna beam in its scanning movement is transmitted to a remote location, the improvement which resides in deriving a continuously variable voltage, the instantaneous magnitude of which is a measure of the particular angular position of said antenna beam in its scanning movement, deriving from said voltage a pair of trigger voltages after reception of substantially all echoes and with the time interval between said trigger voltages being a measure of the instantaneous magnitude of said voltage, transmitting said pair of trigger voltages to a remote location, and recreating at said remote location a voltage which varies in magnitude in accordance with spacing between said pair of trigger voltages.

14. In a system of the character described, wherein it is desired to transmit a low frequency continuously varying voltage indicative of the angular position of an antenna from a sending station to a remote receiving station, the improvement which resides in transforming, at said sending station, said voltage into a pair of spaced pulses of relatively high frequency, the time interval between which is representative of the instantaneous magnitude of said varying voltage, and converting said pair of spaced pulses, at the receiving station, into a voltage representative of the original voltage.

15. In a system of the character described, wherein it is desired to transmit from a sending station to a remotely located receiving station, a continuously varying voltage indicative of the angular position of an antenna, and wherein said antenna has periodically applied thereto pulses of radio frequency energy with a relatively high periodicity, the improvement which resides in converting said voltage into a pair of spaced pulses having the aforementioned periodicity, with the spacing between said pulses representative of the instantaneous magnitude of the voltage, and means for converting, at said receiving station, said pair of pulses into a continuous voltage varying with a relatively low periodicity.

16. The arrangement set forth in claim 15 in which the pair of pulses transmitted from said sending station to said receiving station is delayed and appears a substantial time interval after the supply of each of said radio frequency energy pulses to said antenna.

References Cited in the file of this patent

UNITED STATES PATENTS

| Number | Name | Date |
|---|---|---|
| 2,412,670 | Epstein | Dec. 17, 1946 |
| 2,419,340 | Easton | Apr. 22, 1947 |
| 2,448,016 | Busignies | Aug. 31, 1948 |
| 2,459,482 | Bond | Jan. 18, 1949 |
| 2,519,935 | Smith et al. | Aug. 22, 1950 |
| 2,539,905 | Herbst | Jan. 30, 1951 |
| 2,552,172 | Hawes | May 8, 1951 |
| 2,552,303 | Anderson | May 8, 1951 |
| 2,554,172 | Custin | May 22, 1951 |
| 2,585,855 | Sherwin et al. | Feb. 12, 1952 |